United States Patent [19]
Johnston

[11] 3,927,693
[45] Dec. 23, 1975

[54] HIGH-PRESSURE VALVE
[75] Inventor: Clyde P. Johnston, White Bear Lake, Minn.
[73] Assignee: Minnesota Mining and Manufacturing Company, St. Paul, Minn.
[22] Filed: Oct. 11, 1974
[21] Appl. No.: 514,125

[52] U.S. Cl. .......................................... 137/625.47
[51] Int. Cl.² ........................................ F16K 11/00
[58] Field of Search..... 137/625.47, 625.46, 625.21, 137/625.22, 625.23, 625.24, 625.42

[56] References Cited
UNITED STATES PATENTS
3,048,192  8/1962  Murphy, Jr. ............... 137/625.47 X
3,555,787  1/1971  Lustig ........................ 137/625.47 X FOREIGN PATENTS OR APPLICATIONS
458,988  6/1913  France .......................... 137/625.47

24,040  1902  United Kingdom ............ 137/625.47

Primary Examiner—Martin P. Schwadron
Assistant Examiner—Robert J. Miller
Attorney, Agent, or Firm—Alexander, Sell, Steldt & DeLaHunt

[57] ABSTRACT

A high-pressure valve is disclosed having a cylindrical chamber disposed in a valve body with an inlet and four outlet ports. The cylindrical chamber has a cylindrical valve core rotatably mounted therewithin. The core has three communicating passageways having a Y-shaped configuration. The axis of the passageways, outlets and inlet lie in a common plane perpendicular to the axis of the chamber. The passageways are disposed so that they can simultaneously communicate with the inlet and two outlets, the outlets being disposed at angles to said inlet and having cross-sectional areas such that the vector forces on said core caused by the fluid pressure is essentially zero.

3 Claims, 4 Drawing Figures

HIGH-PRESSURE VALVE

BACKGROUND OF THE INVENTION

1. Field of the Invention

This invention relates to a valve for use in directing fluid under high pressure.

2. Prior Art

It is common practice, in the casting of polymer films and the spinning of polymeric fibers, to melt a polymeric material in an extruder to form a viscous liquid which is then forced through a porous metal or sand-bed filter under pressures as high as 5,000 to 10,000 psi (about 350 to 700 kg/sq. cm). The filter removes unmelted solids, regelled solids and various solid or high viscosity impurities which would otherwise clog the spinning or casting apparatus, or if cast would result in a film or fiber of inferior quality. Traditionally, only one filter has been used between the extruder and dies where the material is cast. When this filter became clogged with gelled or degraded material, it was necessary to shut down the entire operating unit, including the extruder and dies, which were not clogged, in order to remove and clean the clogged filter. The stoppage to change the clogged filter resulted in a loss of production and inefficient use of expensive extruding equipment.

More modern polymer filtration systems use two or more filters to feed the dies, the filters being connected to the extruder by means of a valving system which allows one filter or a group of filters to be used until clogged and then, the extruder flow may be channeled to a second filter or group of filters which will continue to feed the extrusion die. The clogged filters can then be removed and cleaned without interrupting production.

In valve systems for directing the flow of fluid polymers under high pressures to various outlets, it is desirable that the valve 1 not have unbalanced forces on the valve core, 2 not have dead spots in the valve passageway, and 3 have an intermediate position where fluid can exit to a number of outlets as the valve is changing position. A "dead spot" is a place within the valve where a portion of the fluid can stagnate for an extended period of time. Where dead spots exist in valves used for polymer filtration, the polymer in the dead spots begins to degrade and an inferior, nonuniform product results. An intermediate position is desirable since it allows the fluid to be switched from one outlet to another without severe pressure drops in the system.

There exist valves for directing flow from inlets to outlets and where the forces acting on the core are essentially zero. One example of such a valve is U.S. Pat. No. 3,774,634 issued Nov. 27, 1973 to Bonney. This patent discloses a valve having inlet slots in a Y relationship which form a pressure balanced system. In this construction the inlets and outlets are disposed on different transverse planes of the valve core requiring a step shaped passageway, having dead spots, for communication between the inlets and outlets.

U.S. Pat. No. 944,598 issued Dec. 28, 1909 to Caskay discloses a valve having four bores in a valve core, the core being rotatable so as to allow fluid to flow between various ports within the valve housing. Generally, in this configuration one or more of the bores is closed forming a dead spot within the valve core.

U.S. Pat. No. 3,678,960 issued July 25, 1872 to Leibinsohn discloses a stop cock where a plurality of fluid-carrying ducts in a core can be positioned so as to communicate with a plurality of ports to form a variety of flow configurations. The core of this device is not pressure balanced with respect to fluid flow through the core since this device is used for medical sample taking and intravenous infusion and pressure balance is not important.

BRIEF SUMMARY OF THE INVENTION

The valve of the present invention solves the problems of the prior art valves and provides a valve which will direct the flow from an inlet to various outlet ports in such a manner that the vector forces on the valve core are essentially balanced allowing easy rotation of the valve core to switch fluid flow from one set of outlet ports to another. The valve does not have dead spots where fluid can become stagnant and in addition, the valve can have an intermediate position where fluid exits into two sets of outlet ports simultaneously to avoid severe pressure drops as the valve is being changed from one set of ports to another.

A valve body has a cylindrical chamber disposed therein. The body has an inlet port with an axis being in a plane perpendicular to the axis of the chamber. A first set of two outlet ports having a cross-section equal to said inlet port is disposed with one outlet port on each side of the inlet with their axes in the plane of the axis of the inlet port. The first outlets are disposed at equal angles, the angle between the inlet axis and the axis of the outlet ports being no greater than about 90°. A second set of outlet ports greater in cross-sectional area than the inlet port are disposed one on each side of the inlet at equal angles, the angle between the axis of the inlet port and the axis of the second outlet ports being greater than 90° but less than 180°.

A cylindrical valve core is rotatably mounted in the cylindrical chamber in the valve body. The valve core has three passageways connected in a Y-shaped configuration. Two of said passageways are disposed so as to communicate with the inlet port and one of the first set of outlet ports while the third passageway simultaneously communicates with one of said second set of outlet ports. There are means attached to the core for rotating said core to align the ports and passageways to direct the flow of fluid therethrough. The cross-sectional areas and angular arrangements of the ports and passages is such that when fluid flows through said valve, the vector forces on the valve core due to the pressure of fluid against the walls of the passageways through the valve core are essentially zero and there are no dead spots in the valve.

BRIEF DESCRIPTION OF THE DRAWING

A further understanding may be had by referring to the accompanying drawing in which.

DETAILED DESCRIPTION OF THE PREFERRED EMBODIMENTS

Figure 1:
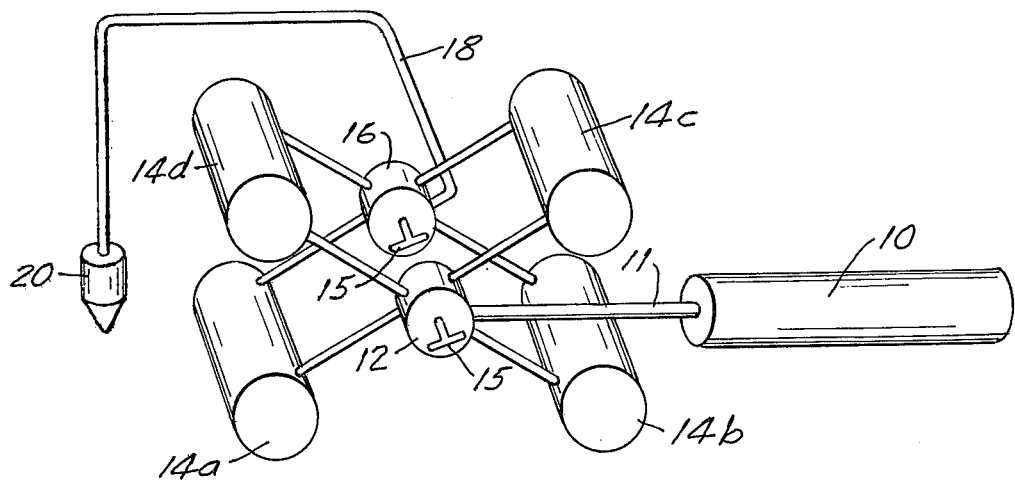
FIG. 1 is a perspective view of a simple extrusion system.

In general, valves of the present invention can be used in filtration systems such as those represented by FIG. 1 where a heated extruder 10 supplies a steady, high-pressure flow of melted polymeric material to a valve 12 via line 11. The valve 12 is adapted to direct the molten polymeric material to various filters 14a, 14b, 14c, and 14d. In one position the valve supplies molten material to the filters 14a and c and in a second position to the filters 14b and d. The filtered material then flows into a valve 16, the same as valve 12 but operating in a reversed manner, which directs the filtered polymer into line 18 leading into an extrusion head 20.

The valve 12 comprises generally a valve body 22 which has an inlet 23. A first set of outlet ports 24 are disposed one on each side of the inlet 23 at equal acute angles from the inlet, the angle between the axis of inlet 23 and the axis of each of the outlets 24 being less than 90°. As shown, the angle between the outlet axis and inlet axis is about 60°. A second set of outlet ports 26 are disposed in the housing 22 at equal obtuse angles from and on either side of the inlet 23. The axes of outlets 26 are at an angle greater than 90° from the axis of the inlet but less than 180°. As shown, the angle between the axis of the inlet port and outlet ports 26 is about 150°

A valve core 28 is disposed to rotatably fit within the casing 22, the core having three passageways 30, 31 and 32 in a Y-shaped configuration. The cross-sectional area of passageways 30, 31, inlet 23 and outlets 24 will be congruent and spaced so that when the passageway 31 is in communication with the inlet 23, the passageway 30 is in communication with one of the outlets 24 and passageway 32 is in communication with an outlet 26 which is furthest from the outlet 24 in communication with passageway 30. The cross-sectional area of passageway 32 and ports 26 is larger than the cross-sectional area of passageways 30 and 31 to provide a balancing vector force equal to the combined vector forces of the inlet 23 and outlet 24.

A rotating means 15 is attached to the valve core 28 to rotate it to the desired position. As shown, the means comprises a valve stem and handle which is operative by hand, however, a valve stem operated by a motor or other mechanical means is also suitable.

Figure 3:
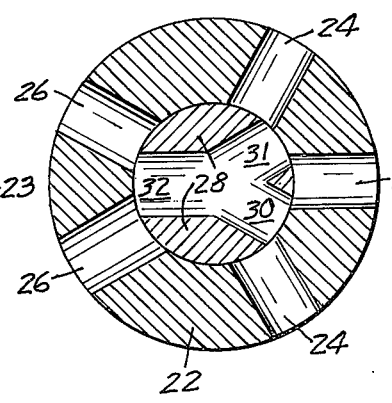
Figure 4:
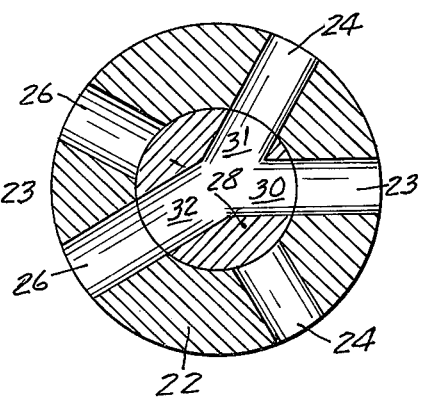

As shown in FIG. 3, the valve core 28 has been turned to a half-way position where the passageways 30, 31 and 32 are positioned so that the inlet 23 is in fluid communication with all four outlets. This core position allows the fluid flow to be directed to a clean set of filters without removing all the pressure from the system allowing uninterrupted casting.

Figure 2:
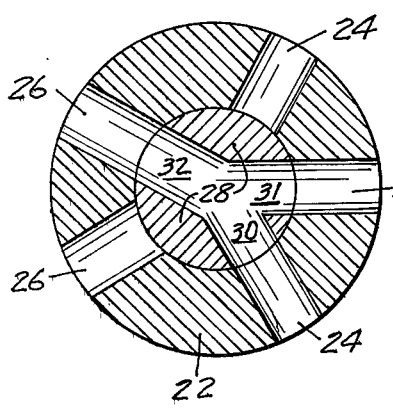
FIGS. 2, 3 and 4 are cross-sectional views of one valve configuration of this invention shown in three positions.

One example of dimensions for a valve as shown in FIG. 2 is:

| | |
|---|---|
| Cross-sectional area of the passageways (30,31), inlet (23) and outlet (24) | 1.77 sq. in. (about 11 sq. cm.) |
| Cross-sectional area of passageway (32) and outlet (26) | 3.06 sq. in. 19.75 sq. cm. |
| Angle between axis of inlet 23 and axis of outlet 24 | 60 degrees |
| Angle between the axis of inlet 23 and the axis of outlet 26 | 150 degrees; and |
| Diameter of the valve core | 4 in. (about 10 cm) |

Various modifications and alterations of this invention will become obvious to those skilled in the art without departing from the spirit and scope of this invention and it is to be understood this invention is not to be limited to the illustrative embodiments set forth hereinbefore.

What is claimed is:

1. A high-pressure valve comprising a valve body having a cylindrical chamber therein, said chamber having an inlet port with an axis which is perpendicular to the axis of said chamber, a first set of two outlet ports having axes which are perpendicular to the axis of said chamber and which lie in a plane common to the axis of said inlet port, each of said first outlet ports having a cross-sectional area equal to said inlet port, said first set of outlet ports being disposed one on each side of said inlet port at equal angles from said inlet port, the angle between the axis of said first outlet ports and the axis of each said inlet port being less than 90°, and a second set of two outlet ports having axes which lie in said plane, each of said second set of outlet ports having a cross-sectional area greater than the area of said inlet port and being disposed at equal angles from said inlet port, the angle between each axis of said second set of outlet ports and the axis of said inlet port being greater than 90° but less than 180°;

a cylindrical valve core rotatably mounted in said chamber, said core having a Y-shaped configuration of three communicating passageways having axes disposed within said plane, two of said passageways being disposed so as to communicate simultaneously with said inlet and one of said first set of outlets while simultaneously the third passageway communicates with one of said second set of outlets; and means attached to said core for rotating said core to align said passageways with said inlet and outlets;

the angles between the axes and the cross-sectional area relationships between said inlet port, said outlet ports and said passageways being selected such that when fluid under pressure is present in said valve the vector forces on said valve core due to the pressure of the fluid are essentially balanced to zero so said valve core can be easily rotated.

2. A high-pressure valve according to claim 1 wherein said Y-shaped configuration of three passageways in said core has said two of said passageways positioned with their axes angularly disposed less than 90° and have a cross-sectional area equal to that of said inlet port and the third passageway has a larger cross-sectional area equal to that of said second set of two outlet ports.

3. A high-pressure valve according to claim 1 wherein said inlet port is positioned to communicate with either of said two of said passageways and that said two of said passageways have their axes spaced about 60° and said third passageway is positioned with its axis angularly positioned about 150° to the axis of either adjacent passageway of said two of said passageways.

* * * * *